United States Patent [19]

Groothius

[11] 4,257,289
[45] Mar. 24, 1981

[54] PORTABLE PIPE END BEVELLING TOOL

[75] Inventor: William Groothius, Calgary, Canada

[73] Assignee: Project Construction Services Ltd., Canada

[21] Appl. No.: 17,621

[22] Filed: Mar. 5, 1979

[51] Int. Cl.³ .............................................. B23B 5/16
[52] U.S. Cl. ...................................... 82/4 C; 144/205
[58] Field of Search ........................ 82/4 C; 144/205; 407/101, 46, 83; 408/150, 211

[56] References Cited

U.S. PATENT DOCUMENTS

| | | | |
|---|---|---|---|
| 1,522,587 | 1/1925 | Hallstrom | 407/101 |
| 2,595,541 | 5/1952 | Riordan | 82/4 C |
| 2,729,991 | 1/1956 | Peterman | 408/150 X |
| 3,303,732 | 2/1967 | Gill | 82/4 C |
| 3,683,725 | 8/1972 | Foss | 144/205 |
| 3,875,832 | 4/1975 | Mayfield | 82/4 C |
| 4,114,484 | 9/1978 | Feamster | 82/4 C |

FOREIGN PATENT DOCUMENTS 1028540 3/1978 Canada ...................................... 82/4 C Primary Examiner—Leonidas Vlachos
Attorney, Agent, or Firm—Beveridge, DeGrandi, Kline & Lunsford

[57] ABSTRACT

A metal pipe bevelling tool has a shaft with a forward end portion on which is mounted a mandrel with movable jaws engageable with the inside of a pipe end to hold the shaft coaxial with the pipe. A tool hub is rotatably supported by a rearward end portion of the shaft, the tool hub carrying cutting tools for bevelling the end of the pipe, and also having means engageable with an auxiliary power drive for rotating the tool hub. The tool hub, and consequently the whole apparatus, is enabled to be fairly small and light by a special mounting arrangement for the cutting tools. In this arrangement, the tool hub has recesses the axes of which lie in a direction extending outwardly and forwardly from the hub, and these recesses are each provided with a tool holding sleeve having an external surface fitting closely within the respective recess and defining a central cavity of square cross section for receiving the shank of a cutting tool. The tool is mounted so that its cutting portion extends beyond the outer end of the sleeve, and the sleeves themselves project outwardly beyond the hub so that the hub can be much smaller than the pipe to be bevelled, while the sleeves still provide adequate support for the cutting tools.

8 Claims, 2 Drawing Figures

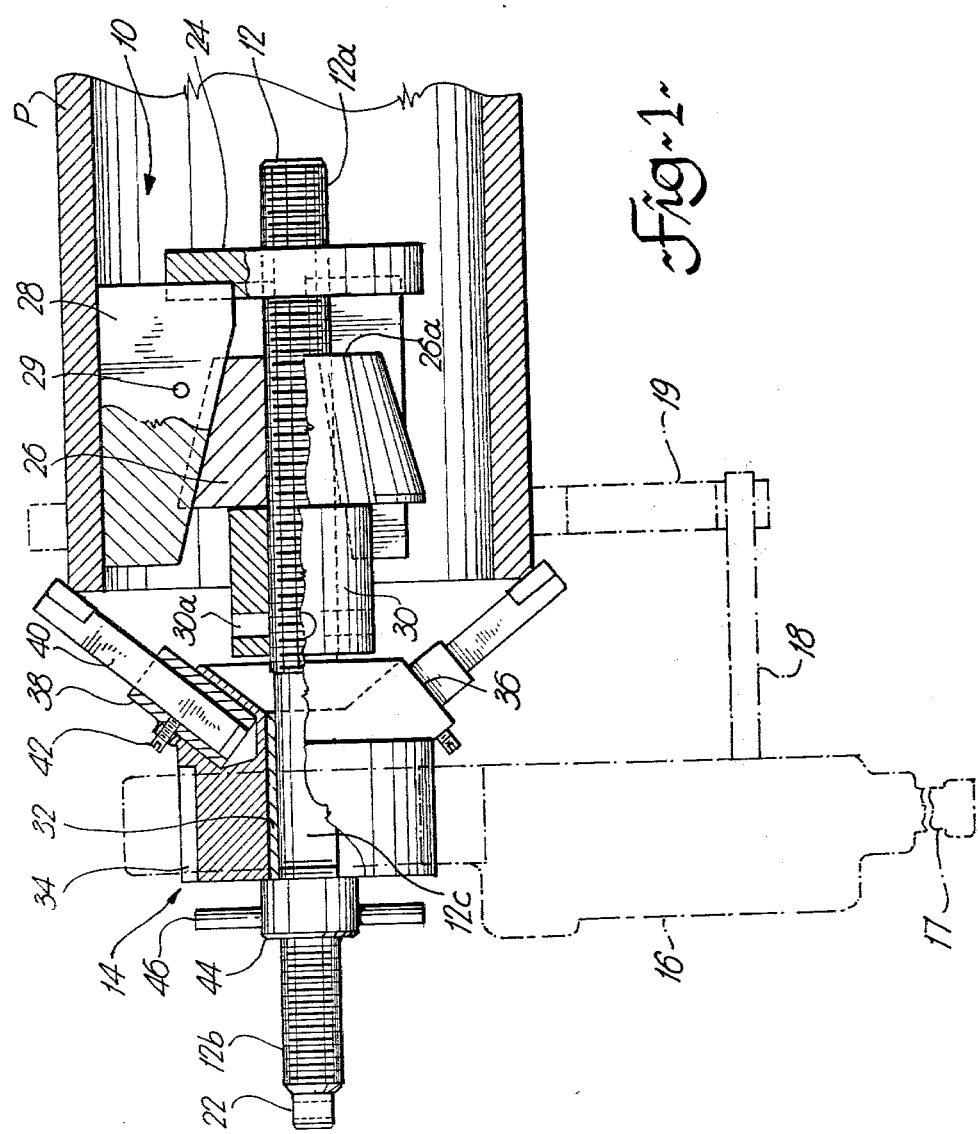

PORTABLE PIPE END BEVELLING TOOL

The present invention relates to a portable pipe bevelling tool, in the nature of a portable lathe, which is suitable for bevelling the ends of metal pipes at an accurately finished 37½° backslope from a plane normal to the pipe axis, in preparation for welding the pipe ends together.

The present invention, at least in its preferred embodiment, provides a tool which meets the following criteria:

(a) it is portable and sufficiently compact and light in weight that it can be handled by one man climbing up ladders and scaffolds. The preferred embodiment of tool does not weigh more than 25 pounds;

(b) the tool is readily adjustable to bevel pipe ends over a range of pipe sizes and wall thicknesses, the adjustability being provided by simple means and by readily interchanged components, and not requiring special tooling;

(c) the tool has shafting which is sufficiently strong not to flex appreciably when the tool is initially applied to a roughly cut pipe end;

(d) components such as cutting tools are readily available from existing sources; and (e) the tool as a whole is sufficiently compact to permit its use in confined spaces. In the preferred embodiment, the rotating part of the tool does not exceed the diameter of the pipe by more than about 1 inch.

Portable pipe bevelling tools are known which are provided with a mandrel capable of being placed and locked within a pipe end, the mandrel supporting a shaft on which a tool hub is mounted. In some designs, the tool hub is intended to be rotated manually, and in others a power drive is provided for rotating the hub. Typical designs of pipe bevelling tool intended to perform functions similar to the tool of this invention, are shown in the following patents:

Canadian Pat. No. 1,000,089 which issued Nov. 23, 1976 to Mayfield

Canadian Pat. No. 1,028,540 which issued Mar. 28, 1978, to Multi-Fab Inc.

U.S. Pat. No. 3,229,555 which issued Jan. 18, 1966 to Castles, and

U.S. Pat. No. 3,982,451 which issued Sept. 28, 1976 to Multi-Fab Inc.

The designs shown in these patents, and in fact all designs known to the applicants, suffer from practical disadvantages especially in being cumbersome, at least if designed to machine pipes of fairly large diameter, for example, 6 inches or 8 inches diameter. Also, in many cases, the tool carrying portion of the tool hub projects well beyond the radius of a pipe being bevelled, and such tools are not suitable for use in confined spaces.

For example, the aforementioned Canadian Pat. No. 1,000,089 shows a device in which custom designed cutting tools fit within a tool hub in such a way that the external diameter of the tool hub is substantially greater than the maximum diameter of the pipe to be bevelled. If this tool were to be designed for pipes of 6 inches or 8 inches diameter, the weight of the tool would become prohibitive. For similar reasons, the tools shown in the other three patents mentioned above are also not suitable for pipes of such large diameters, and in addition the devices of these three latter patents are rather complex.

The present invention provides a portable pipe bevelling tool which is similar to some known tools in having a shaft, and a mandrel mounted at a forward end of the shaft, the mandrel having movable jaws and means for moving the jaws outwardly into firm gripping engagement with the interior of a pipe end to be bevelled, so as to hold the shaft coaxial with the pipe. A rearward end portion of this shaft supports a tool hub which is rotatable relative to the shaft and has means for engagement with a power drive for rotating the hub, and means are provided for feeding the hub forwardly on the shaft during a bevelling operation. In accordance with a particular feature of this invention, the tool hub has recesses the axes of which lie in a direction extending outwardly and forwardly from the hub, these recesses each being provided with a tool holding sleeve having an external surface fitting closely within the respective recess and defining a central cavity of rectangular (and preferably square) cross section for receiving the shank of a cutting tool of like cross section, and with the sleeves projecting outwardly beyond the maximum outer diameter of the hub. The hub includes screw means for holding the cutting tools in place and which allows easy replacement of these cutting tools.

In addition, replacement sleeves of different lengths may be provided, also held in place by the screw means, and interchangeable to suit the tool to different diameters of pipe. The mandrel jaws may also be replaceable to suit widely different pipe diameters.

The power drive for rotating the tool hub is preferably an auxiliary unit of known form.

A preferred embodiment of the present invention will now be described with reference to the accompanying drawings, in which:

FIG. 1 is a partially sectioned plan view of the bevelling tool as attached to a pipe end, and showing auxiliary equipment schematically and in phantom lines, and FIG. 2 is a view showing the end of the mandrel of the tool of FIG. 1.

As shown in FIG. 1, the tool is fixed to the end of a pipe P while the latter is horizontally supported. The tool is fixed to the pipe end by means of a mandrel indicated generally at 10, the mandrel being inserted into the pipe end and supporting the forward end of a shaft 12 so that the shaft is coaxial with the pipe. The rearward end of shaft 12 supports a tool hub 14, which is adapted to be driven by an auxiliary power drive 16 which is a unit presently available for other purposes. A suitable unit is the "Rigid 700" (Trade Mark) sold by the Rigid Tool Company. The power drive 16 has a handle 17 and may be supported entirely by hand, but since there is a reaction force on the power drive a connecting bar 18 is preferably provided between this power drive means and a chain clamp device indicated diagrammatically at 19, and which includes a sprocket chain surrounding and gripping the pipe end so that torque can be transferred from the power drive 16 to the pipe.

Turning now to the elements of the tool itself, the central shaft 12 is a steel shaft of about 1 inch diameter, and having a forward threaded portion 12a occupying about half the shaft length, and having a rear threaded portion 12b of lesser diameter close to its rear end, with an unthreaded portion 12c between the two threaded portions. The extreme rear end of the shaft has a cross bore 22.

The mandrel comprises firstly a mandrel end plate 24 which is a thick circular plate screw threaded onto portion 12a of the shaft, and having three equi-spaced radial slots 24a as indicated in FIG. 2. A mandrel expander hub 26, of frusto-conical shape, is freely slidable on the screw threaded portion 12a of the shaft, and the conical surface of this hub has three equally spaced longitudinal slots 26a. The slots 24a and 26a are designed to locate the respective end and sloping inner edge faces of three jaws 28, which are in the form of plates having outer edge faces bevelled as shown in FIG. 2 and arranged to be parallel with the shaft axis when the respective edges of the jaws are located by the hub and end plate. These jaws 28 are normally retained in position by a retainer spring (not shown) which passes through holes 29 in the jaws and which encircles the hub, the spring being in tension to urge the jaws inwardly. The positions of the mandrel expander hub and jaws is determined by a mandrel nut 30 which is threaded onto the portion 12a of the shaft, and which has radial bores 30a for receiving a tool by which the nut may be tightened against the expander hub to cause the jaws to expand into firm engagement with the interior surfaces of a pipe end. Accordingly, the mandrel and forward end portion of the shaft 12 can be firmly locked into position in a pipe end by inserting the mandrel within the pipe end and rotating the nut 30, preventing rotation of the shaft 12 by a bar inserted into bore 22.

The tool hub 14 is provided with a bronze bushing 32 forming a bearing for rotating on the unthreaded portion 12c of the shaft. The rearward part of the tool hub is generally cylindrical, but provided with oppositely placed longitudinal slots 34 designed to engage with rotating parts of the power drive 16. The forward portion of the tool hub 14 has a bevelled surface 36 which is provided with two oppositely placed, cylindrical bores which are drilled into the hub from the surface 36 at an angle of $37\frac{1}{2}°$ to a normal to the hub axis. Each of these bores receives a tool holding sleeve 38, which has a cylindrical exterior fitting closely within the bore, and has an internal axial cavity which is square in cross section. In the design as shown, the sleve is of such length as to project perhaps 1 inch from the surface 36, but sleeves of different lengths may be used in the same bore for purposes to be described. The square recess of each sleeve 38 is designed to receive the square shank of a cutting tool 40, and the cutting tools are held in place by set screws 42 which pass through tapped holes in the hub, and which also pass through holes in the sleeves 38 so as to simultaneously hold the cutting tool and sleeve in place. The cutting edge 40a of the cutting tool 40 is parallel to its axis so that when engaging with the end of pipe P it cuts a bevel which is $37\frac{1}{2}°$ from the normal to the pipe axis.

In front of the tool hub 14, a tool feed nut 44 is provided, which engages with the screw threaded portion 12b of the shaft. This feed nut has short handles 46. The front end of the hub 14 is recessed so as not to interfere with the mandrel nut 30 as the hub is advanced.

In operation, the tool is fixed to a pipe end by means of the mandrel, as described. The cutting tools 40 are then adjusted, by means of the set screw 42, so that the cutting edges extend just past the outside face of the pipe. With the tool hub positioned so that the cutting tools are clear of the pipe end, the power drive 16 is positioned over the tool hub 14, and operated while the feed nut 44 is rotated to gradually move the tool hub towards the pipe end until the cutting tools engage the pipe. Bevelling is achieved simply by gradually feeding the tool hub towards the pipe end as cutting takes place.

A feature of the present invention is the ready adaptability of the tool to substantially different diameters of pipe. This is achieved by providing, in addition to the components shown, one or two further sets of mandrel jaws 28, and one or two further sets of tools and tool sleeves, to cover differing ranges of pipe diameters. For example, the parts as shown in FIG. 1 are suitable for bevelling the end of a pipe of perhaps 6 or 7 inches diameter. For larger tools, the jaws 28 will be replaced by wider jaws, and both the tool holding sleeves 38 and the tools 40, will be replaced by longer elements so that the sleeve provides adequate support for the outer end of the tool. For smaller pipe sizes, for example down to 4 inches diameter, jaws 28 will be replaced by narrower jaws, and the tool sleeves and cutting tools replaced by shorter elements so that the operative part of the cutting tool is quite close to the surface 36 of the tool hub. With these adjustments, the same tool can be used for bevelling pipes from 4 inches to 8 inches nominal diameter. In most of these variations, the diameter of the tool hub will be less than the outer diameter of the pipe being bevelled, and for the larger sizes of pipes the inner diameter of the pipe will be at least 50% larger than the maximum tool hub diameter, so that the tool is always relatively light and portable as compared to prior art tools. Also, there is no necessity for the cutting tools to extend by any appreciable amount beyond the outer diameter of the pipes so that the tool is suitable for use in confined spaces.

Another feature of the preferred embodiment of this invention is that the mandrel and hub are both supported by a common shaft of uniform diameter which provides very solid support for the tool hub. By contrast, in the arrangement of aforesaid Canadian Pat. No. 1,000,089, the mandrel is only supported by a relatively slender, inner shaft. However, it is not intended that this invention be limited to this construction.

I claim:
1. A portable pipe end bevelling tool comprising:
   a shaft,
   a mandrel mounted at a forward end of said shaft, said mandrel having movable jaws and means for moving said jaws outwardly into firm gripping engagement with the interior of a pipe end to be bevelled so as to hold said shaft coaxial with said pipe end,
   a tool hub supported by a rearward end portion of said shaft, said tool hub being rotatable relative to the shaft and having means for engagement with a power drive for rotating said hub,
   means for feeding said hub forwardly relative to said shaft during a bevelling operation
   said tool hub having cylindrical bores the axes of which lie in a direction extending outwardly and forwardly from the hub, said recesses each being provided with a tool holding sleeve having an external surface fitting closely within the respective recess and defining a central cavity of rectangular cross section for receiving the shank of a cutting tool of like cross section, said sleeves projecting outwardly beyond the maximum outer diameter of said hub, and said hub including screw means for holding said cutting tools in place and allowing easy replacement of said tools wherein the cutting tools, sleeves, hub and mandrel are dimensioned so that said bevelling tool can bevel a pipe having an inner diameter greater than the maximum diameter of the hub.

2. A tool according to claim 1, wherein each sleeve has an aperture for receiving the end portion of said screw means so that said screw means can pass through said aperture and grip the cutting tool.

3. A tool according to any of claims 1 to 2, wherein the axis of each said recess lies at an angle of the order of 37½° to a normal to the tool hub axis.

4. A kit of parts for bevelling pipe ends including a tool in accordance with claim 1, said kit including a replacement set of cutting tools and tool holding sleeves, said replacement sleeves being dimensioned to fit within said hub recesses and said replacement tools being dimensioned to fit within said replacement sleeves, whereby said tool can be adapted for different pipe diameters by selection of cutting tools and sleeves of varying lengths.

5. A kit of parts according to claim 4 further including a set of replacement jaws for said mandrel and having radial dimensions different to the jaws of the mandrel as set out in claim 1, to suit the tool to differing pipe diameters.

6. A tool according to claim 1, wherein the outermost diameter of the tool hub is less than the diameter of said mandrel segments when the latter are retracted to their minimum diameter.

7. A tool according to claim 1, wherein the cutting tools, sleeves, hub and mandrel are dimensioned so that said tool can bevel a pipe having an inner diameter at least 50% greater than the maximum diameter of the hub.

8. A tool according to claim 1, wherein said screw means extends through a part of said hub lying radially outwardly of the respective recess.

* * * * *